United States Patent
Jia et al.

(10) Patent No.: US 10,740,241 B2
(45) Date of Patent: Aug. 11, 2020

(54) METHOD AND DEVICES FOR MANAGING CACHE

(71) Applicant: EMC IP Holding Company LLC, Hopkinton, MA (US)

(72) Inventors: Ruiyong Jia, Beijing (CN); Xinlei Xu, Beijing (CN); Lifeng Yang, Beijing (CN); Xiongcheng Li, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/995,386

(22) Filed: Jun. 1, 2018

(65) Prior Publication Data
US 2019/0102308 A1    Apr. 4, 2019

(30) Foreign Application Priority Data

Jun. 2, 2017   (CN) .......................... 2017 1 0408918

(51) Int. Cl.
| G06F 12/0871 | (2016.01) |
| G06F 12/0804 | (2016.01) |
| G06F 12/0891 | (2016.01) |
| G06F 11/34 | (2006.01) |
| G06F 12/0815 | (2016.01) |

(52) U.S. Cl.
CPC ...... *G06F 12/0871* (2013.01); *G06F 11/3419* (2013.01); *G06F 12/0804* (2013.01); *G06F 12/0815* (2013.01); *G06F 12/0891* (2013.01); *G06F 2201/81* (2013.01); *G06F 2201/885* (2013.01)

(58) Field of Classification Search
CPC ............ G06F 12/0815; G06F 12/0871; G06F 12/0891; G06F 12/0802; G06F 11/3419; G06F 12/0804; G06F 2201/81; G06F 2201/885; G06F 3/061; G06F 3/0638
See application file for complete search history.

(56) References Cited

U.S. PATENT DOCUMENTS

| 9,141,531 B1* | 9/2015 | Salehudin ........... G06F 12/0246 |
| 2003/0084252 A1* | 5/2003 | Talagala .............. G06F 12/0866 |
|  |  | 711/135 |
| 2016/0077974 A1* | 3/2016 | Kim .................... G06F 12/0804 |
|  |  | 711/135 |
| 2018/0165221 A1* | 6/2018 | Fowler .................. G06F 12/128 |
| 2019/0220201 A1* | 7/2019 | Jia ......................... G06F 3/0611 |

* cited by examiner

*Primary Examiner* — Zhuo H Li
(74) *Attorney, Agent, or Firm* — Brian J. Colandreo; Mark H. Whittenberger; Holland & Knight LLP

(57) ABSTRACT

Embodiments of the present disclosure relate to a method and apparatus for managing cache. The method comprises determining a cache flush time period of the cache for a lower-layer storage device associated with the cache. The method further comprises: in response to a length of the cache flush time period being longer than a threshold length of time, in response to receiving a write request, determining whether data associated with the write request has been stored into the cache. The method further comprises: in response to a miss of the data in the cache, storing the write request and the data in the cache without returning a write completion message for the write request.

17 Claims, 5 Drawing Sheets

METHOD AND DEVICES FOR MANAGING CACHE

RELATED APPLICATIONS

This application claim priority from Chinese Patent Application Number CN201710408918.3, filed on Jun. 2, 2017 at the State Intellectual Property Office, China, titled "METHOD AND DEVICE FOR CACHE MANAGEMENT" the contents of which is herein incorporated by reference in its entirety.

FIELD

Embodiments of the present disclosure relates to the field of memories, and specifically to a method and apparatus for managing cache.

BACKGROUND

Since a data access speed of a large-capacity storage device is generally lower, the data processing speed between a computing device and a large-capacity storage device is very slow. Since cache has a fast data processing capability and commonly-used data are generally relatively centralized, the data processing capability can be improved quickly by arranging a cache between the computing device and the large-capacity storage device. Since the data processing capability of the cache is close to a processor's capability, it is possible to quickly receive the data sent by the processor and send the cached data quickly to the processor. Data that are not used in the cache will be flushed to the storage device through an interface connected to the storage device.

Since the cost of cache is higher, a cache with a suitable storage capacity will be arranged for purpose of economics of the computing device. This arrangement causes the storage capacity of the cache smaller than the storage capacity of the storage device. Therefore, it is impossible to store all data in the storage device in the cache. In an existing method of writing data to the large-capacity storage device, it is determined firstly whether data pages to be stored in the storage device exist in the cache. If there are data pages existing in the cache, the data are written into already-existing data pages. If the data pages do not exist in the cache, the data are written into a new cache page in the cache. Regarding data not often used in the cache, the data in the cache pages are flushed to the storage device at a proper time to keep data consistent.

SUMMARY

An object of embodiments of the present disclosure is to provide a method and apparatus for managing cache.

According to a first aspect of the present disclosure, there is provided a method of managing cache. The method comprises determining a cache flush time period of the cache for a lower-layer storage device associated with the cache. The method further comprises: in response to a length of the cache flush time period being longer than a threshold length of time, in response to receiving a write request, determining whether data associated with the write request has been stored into the cache. The method further comprises: in response to a miss of the data in the cache, storing the write request and the data in the cache without returning a write completion message for the write request.

In some embodiments, the method further comprises: determining a first number of storage blocks in the cache that are released by a flush to the storage device and are available for the storage device; and in response to the number being greater than a second number of storage blocks occupied by the data, sending the write completion message for the write request.

In some embodiments, determining the cache flush time period for the storage device comprises: obtaining a plurality of historical flush time periods for a plurality of previous flushes from the cache to the storage device; and determining the cache flush time period by averaging the plurality of historical flush time periods.

In some embodiments, the method further comprises: in response to the length of the cache flush time period being longer than the threshold length of time, marking the storage device for processing the write request.

In some embodiments, the method further comprises: in response to sending the write completion message, subtracting the second number from the first number.

In some embodiments, the method further comprises: comparing a first length of time of the write request being stored in the cache and a predefined second length of time; in response to the first length of time exceeding the second length of time, determining a dirty block rate in the cache associated with the storage device; and in response to the dirty block rate being lower than a predetermined threshold, sending the write completion message for the write request.

In some embodiments, the method further comprises: determining a first number of storage blocks in the cache that are released by a flush to the storage device and are available for the storage device; obtaining the number of storage blocks in the cache and the number of dirty blocks in the cache; and determining the dirty block rate based on the first number, the number of storage blocks in the cache and the number of dirty blocks in the cache.

A second aspect of the present disclosure provides a cache manager, wherein a cache using the cache manager comprises a plurality of storage blocks. The cache manager comprises: a processor, and a memory having computer program instructions stored thereon, the processor executing the computer program instructions in the memory to control the memory system to perform acts comprises: determining a cache flush time period of the cache for a lower-layer storage device associated with the cache; and in response to a length of the cache flush time period being longer than a threshold length of time, in response to receiving a write request, determining whether data associated with the write request has been stored into the cache; in response to a miss of the data in the cache, storing the write request and the data in the cache without returning a write completion message for the write request.

A third aspect of the present disclosure provides a computer program product. The computer program product is tangibly stored on a non-volatile computer-readable medium and comprises machine-executable instructions which, when executed, cause a machine to perform steps of the method according to the first aspect of the present disclosure.

BRIEF DESCRIPTION OF THE DRAWINGS

Through the more detailed description of example embodiments of the present disclosure in conjunction with the accompanying drawings, the above and other objects, features and advantages of the present disclosure will become more apparent, wherein the same reference generally refers to the same components in the embodiments of the present disclosure.

Throughout the drawings, the same or similar reference symbols refer to the same or similar elements.

DETAILED DESCRIPTION

Figure 1:
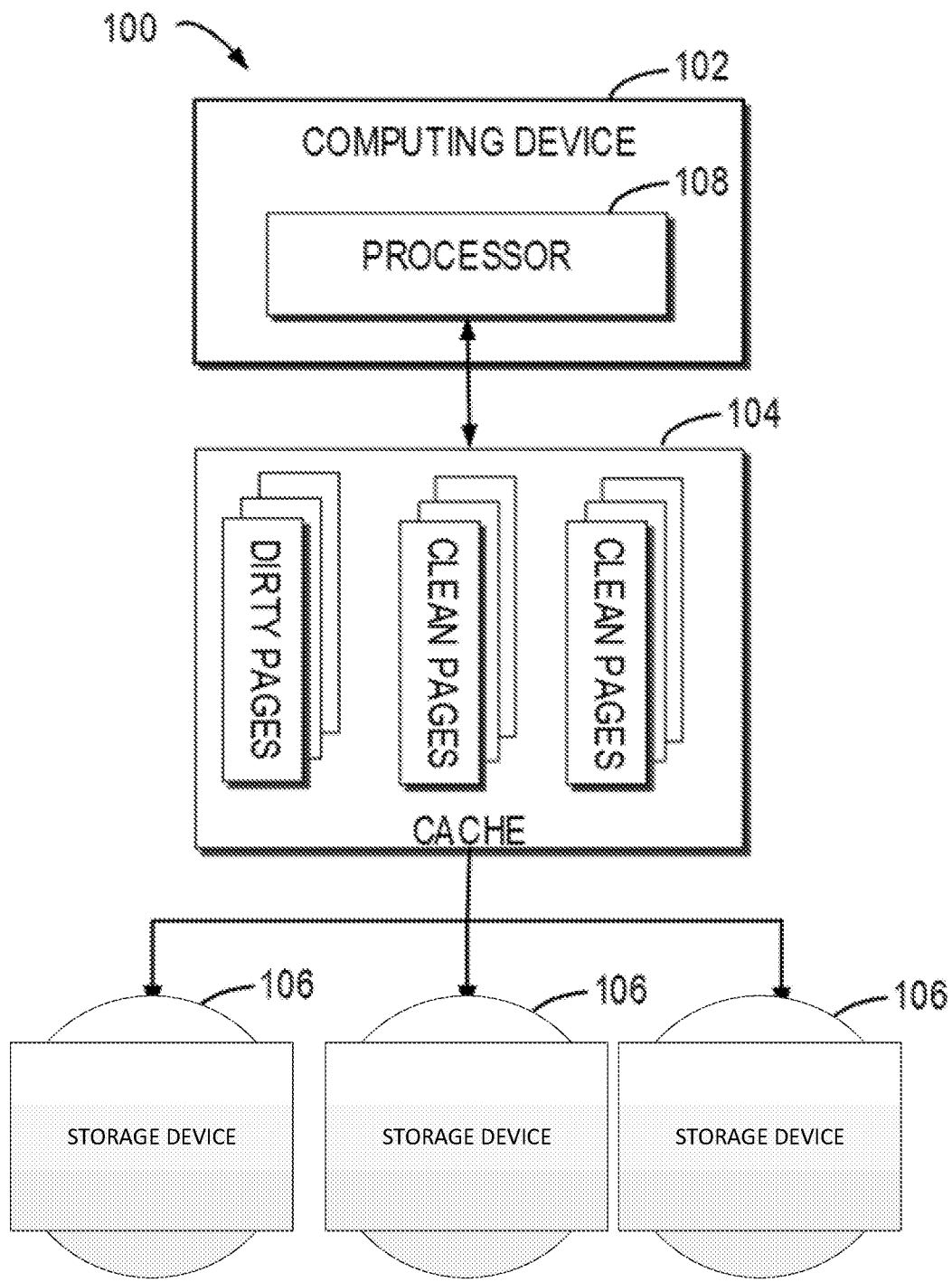
FIG. 1 illustrates a diagram of architecture of a system 100 according to an embodiment of the present disclosure.

Embodiments of the present disclosure will be described in more detail with reference to figures. Although figures show some embodiments of the present disclosure, it should be appreciated that the present disclosure may be implemented in many forms and the present disclosure should not be understood as being limited to embodiments illustrated here. On the contrary, these embodiments are provided here to enable more thorough and complete understanding of the present disclosure. It should be appreciated that figures and implementations of the present disclosure are only used for exemplary purposes and not used to limit the protection scope of the present disclosure.

As described in the embodiments of the present disclosure, the term "includes" and its variants are to be understood as open-ended terms that mean "includes, but is not limited to." The term "based on" is to be considered as "based at least in part on." The term "an example embodiment" or "the example embodiment" is to be read as "at least one example embodiment". Terms such as "first" and "second" may refer to different or identical objects. The following text might include other explicit and implicit definitions.

The principles of the present disclosure will be described with reference to several example embodiments shown in the figures. Although figures show preferred embodiments of the present disclosure, it should be appreciated that these embodiments are described only to enable those skilled in the art to better understand and thereby implement the present disclosure, not to limit the scope of the present disclosure in any manner.

When the processor writes data into the storage device, data may be written into the cache first. Hence, the processor sends a write request to the cache through one or more input/output I/O threads. After receiving the write request, the cache first determines whether a data block corresponding to an address for write exists in the cache. If the data block exists in the cache, the data are directly written into the corresponding data block. If the data block corresponding to the address in the write request does not exist in the cache, a write-miss will be generated, and then the cache will allocate it a new data block for storing data. When data in the cache needs to be moved out of the cache, data in dirty pages in the cache inconsistent with the data in the storage device will be flushed to the storage device to keep data consistent.

When the cache flushes the data to the storage device, the flush speed becomes slower due to various factors, for example, there is something wrong with a storage device driver or with partial storage medium. Since the data processing speed between the cache and the processor is faster than the data processing speed between the cache and the storage device, the storage block in the cache will be quickly consumed by various input/output operations (I/O) sent from the processor, particularly when the storage block corresponding to the storage address in the write request sent by the processor is not in the cache.

To solve at least the above problems and other potential problems, embodiments of the present disclosure provide a solution to manage cache. In the solution, the data management efficiency of cache is improved by limiting various input/output operations.

FIG. 1 illustrates a diagram of architecture of a system 100 according to an embodiment of the present disclosure. A computing device 102 includes a processor 108 for processing various applications. A cache device 104 is used to cache data processed by the processor 108 and data read from a storage device 106.

The storage device 106 is a storage device for storing large-capacity data. The storage device may comprise various volatile and/or non-volatile data storage medium. Examples of the storage medium may include but are not limited to disk array, magnetic disk, optical disk, hard disk, and solid-state disk (SSD). The disk array may be a disk array at different levels, and may include but not limited to RAID0, RAID1, RAID0+1, RAID2, RAID3, RAID4, RAID5, RAID7, RAID10 and RAID53.

The data processing speed between the processor 108 and the cache 104 is very fast and the flush speed between the cache 104 and the storage device 106 is slower. Therefore, when the speed between the cache 104 and the storage device 106 is slower or the storage device 106 is confronted with partial problems, the write speed for the storage device falls. The method for solving the problem will be described in detail in the following description.

Figure 2:
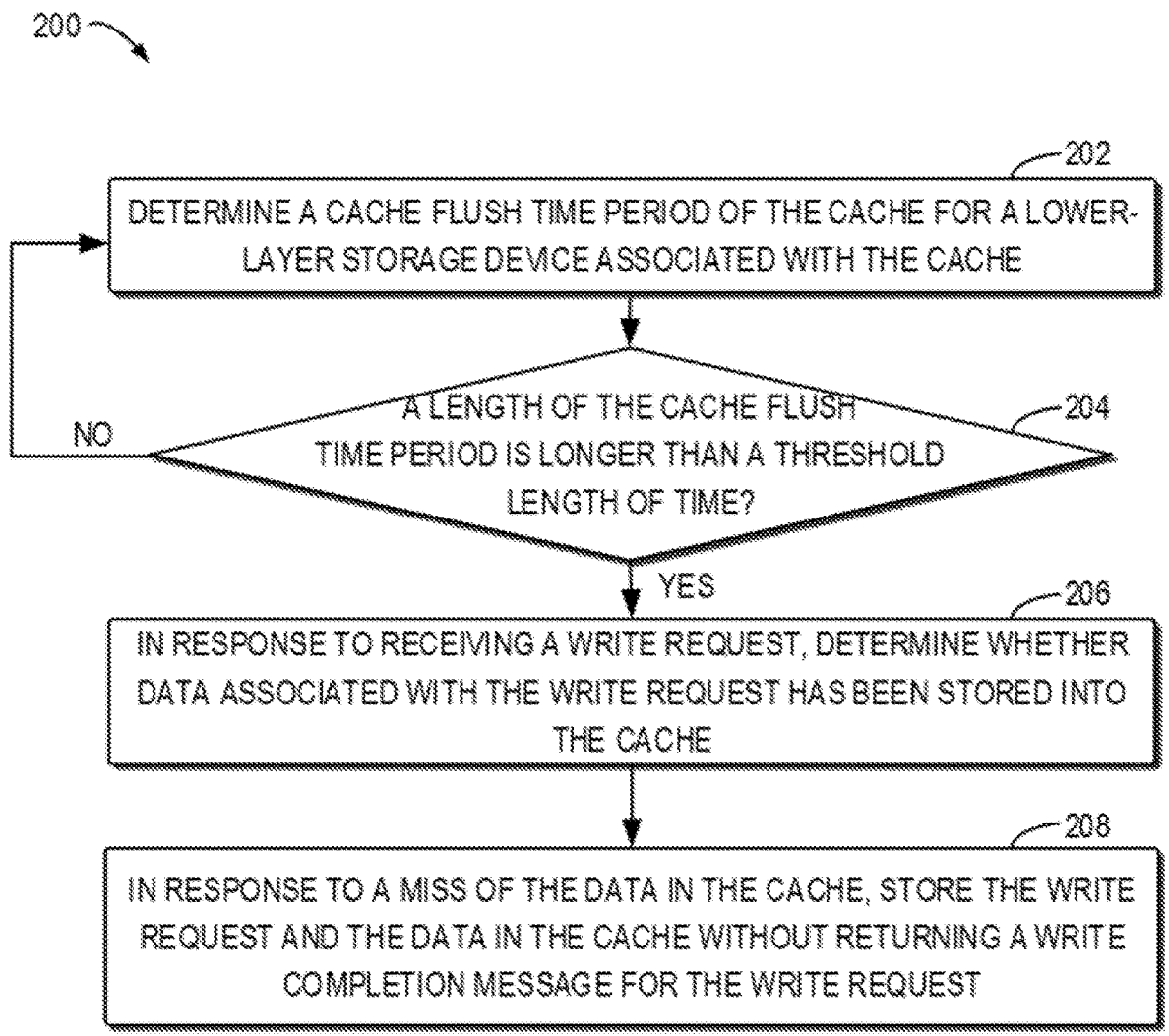
FIG. 2 illustrates a schematic diagram of a method 200 for managing cache according to an embodiment of the present disclosure.

FIG. 2 illustrates a schematic diagram of a method 200 for managing cache according to an embodiment of the present disclosure. Since the flush speed between the cache 104 and the storage device 106 affects the use of the cache, the following embodiments of the present disclosure use management data of cache flush to limit an upper-layer processor's operation for the cache.

When the cache flushes data to the storage device, the time of the cache's flush operation each time is stored. At block 202, firstly, a cache flush time period of the cache for a lower-layer storage device associated with the cache is determined. In an alternative embodiment, when the cache 104 performs a data flush operation one time for the storage device 106, the length of the time period needed for performing the flush operation is recorded. Since operating one time cannot accurately reflect the length of the time period of the flush performed by the cache 104 to the storage device 106, the length of the time period of the current flush operation is employed in combination with historical flush time periods of many previous flushes to obtain the duration of the time period of the flush performed by the cache 104 to the storage device 106.

In an alternative embodiment, the length of the time period of the flush performed by the cache 104 to the storage device 106 may be obtained by weight averaging length of a plurality of flush time periods. The flush time period closer in time has a larger weight. In another alternative embodiment, the length of the time period of the flush performed by the cache 104 to the storage device 106 may be obtained by averaging length of a plurality of flush time periods. In a further alternative embodiment, the length of the time period of the flush performed by the cache 104 to the storage device 106 may be obtained through various appropriate functions.

At block 204, the cache flush time period is compared with a preset threshold length of time. If the cache flush time period is longer than the preset threshold length of time, this indicates that the flush speed of the cache becomes slower and might cause the data blocks of the cache are excessively occupied. This also indicates that there is something wrong with the data processing capability between the cache and the storage device corresponding to the flush operation. In an alternative embodiment, the storage device is identified, and then the write request of the identified storage device is processed.

The preset threshold length of time may be set according to needs. In an alternative embodiment, the threshold length of time may be a length of time that usually matches the interaction data between the cache and the processor without causing cache blocks to be excessively occupied.

At block 206, if the write request is received, first, whether the data associated with the write request has been stored in the cache is determined. If the data associated with the write request has been written into the cache, this indicates that data written by the write request at this time do not occupy new storage blocks, data may be written and the write completion information is returned to the upper layer. If the data associated with the write request is not stored in the cache, this indicates that the data misses in the cache.

At block 208, in response to the a miss of the data in the cache, the data to be written by the write request is written into a new storage block in the cache. To limit the I/O associated with the write request from operating again, at this time the write request is placed in the cache to form a queue of write request that write is completed, but the write completion information of the write request will not be returned to the upper layer. Therefore, the I/O operation corresponding to the write request will wait the write request to return information, thereby no longer performing corresponding write operation. This can limit the number of I/O operations and avoid excessive occupation of the cache blocks. In an alternative embodiment, the write request is management information for writing data. In an alternative embodiment, the data block is a data page.

Figure 3:
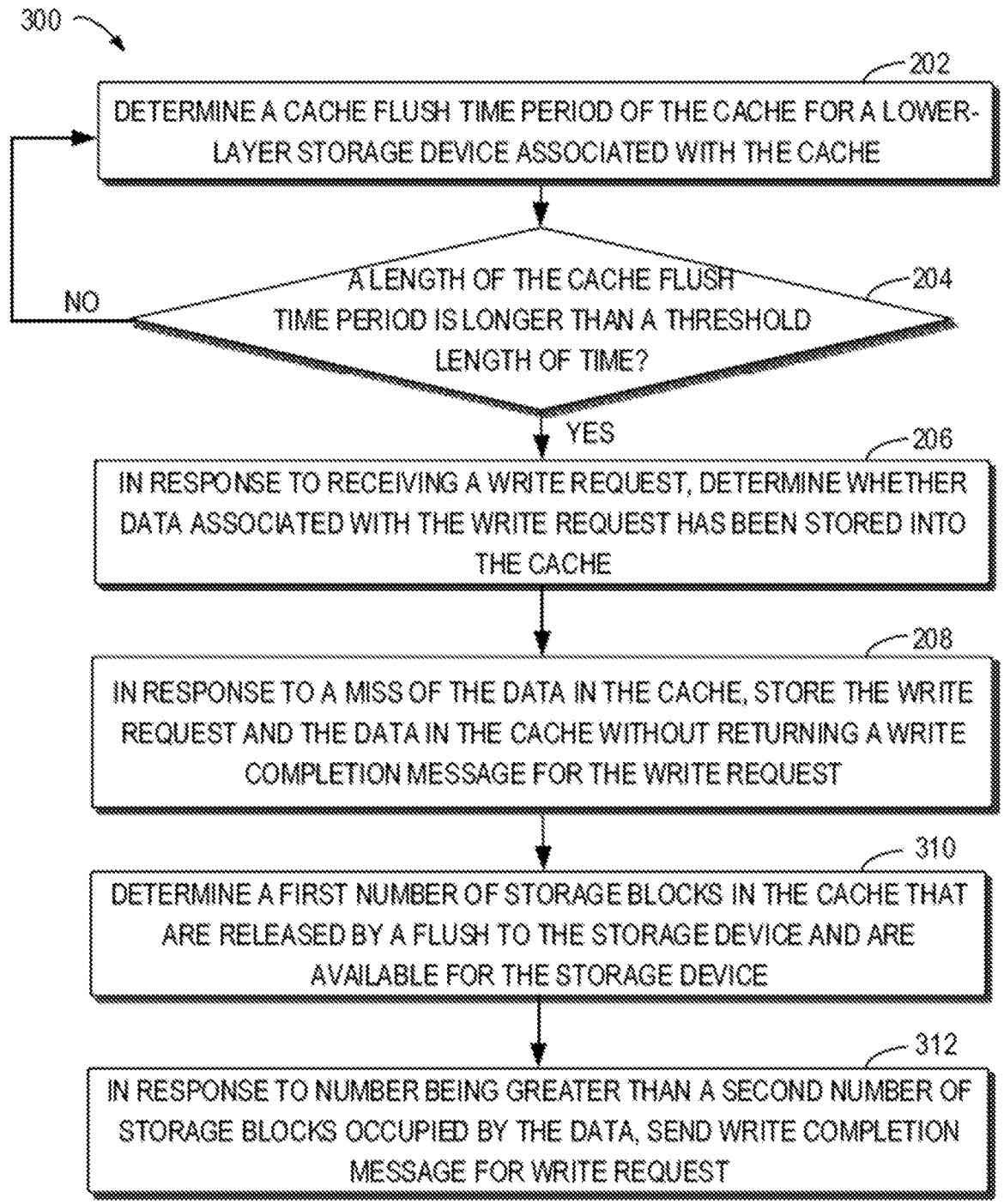
FIG. 3 illustrates a flow chart of a method 300 for managing cache according to an embodiment of the present disclosure.

FIG. 3 illustrates a flow chart of a method 300 for managing cache according to an embodiment of the present disclosure. The content in Blocks 202-208 is identical with the content in Block 202-208 in FIG. 2. Since the content has already been described with reference to FIG. 2, it will not be described in detail. Blocks 310-312 in FIG. 3 are mainly described here.

After the time of cache flush is judged, although the write request operation is limited, the length of the flush time period might be still longer than a predetermined threshold after judging the flush time each time. Since each flush operation releases a certain number of data blocks, if the write request is still limited in this case, the released storage blocks are not used, which might cause waste of the resources of the cache and also limits the processing efficiency of the I/O write request. To solve the problem, the storage blocks released by the flush operation are further managed in the embodiments of the present disclosure.

At block 310, after the cache completes the flush action each time, statistics are performed to obtain the number of storage blocks released by the current flush action. The number of storage blocks released by the current flush action is added to the number of previously-accumulated released storage blocks to determine the number of storage blocks accumulatively released for the storage device after the current flush action, thereby determining how many released storage blocks may be used for write operations for the storage device.

In the previous operation, the cache-miss write requests are stored in a queue in the cache. In an alternative embodiment, the write request may be stored in a first-in first-out queue. In another alternative embodiment, the write requests may be ranked based on importance of write requests. In a further alternative embodiment, the write requests may be ranked in other appropriate manners.

A write request in the write request queue is selected, and then the number of storage blocks occupied by written data for the write request is determined. In an alternative embodiment, the write request is a write request ranking topmost in the write request queue. At block 312, if the number of accumulative-released storage blocks is greater than or equal to the number of storage blocks occupied by the data of the selected write request, this indicates that the number of released storage block already exceeds the number of already-occupied storage blocks, so a write completion message for the selected write request may be sent to the upper layer. This manner enables sufficient use of storage blocks released by the flush operation and also improves the utilization rate of the cache.

After the write completion message is sent to the upper layer, the number of storage blocks occupied by the write request for which the write completion message is currently sent is subtracted from the number of the accumulated storage blocks.

In an alternative embodiment, if the number of storage blocks released by the current flush operation is 5, and the number of storage blocks previously accumulatively released is zero, the number of the accumulatively released storage blocks at this time is 5. If the number of storage blocks occupied by the data for the currently selected write request is smaller than or equal to 5, the currently selected write requests are released, and the number of storage blocks occupied by data of the currently released write request is subtracted from the number of the accumulatively released storage blocks. If the number of storage blocks occupied by data of the currently selected write request is larger than 5, operation will not be performed for stored write request, and judgment will be made after next flush operation is completed.

The above embodiment well solves the problem about excessive occupation of the cache, but the above operation only considers using parameters of the flush data between the cache and the storage device to manage the cache, without considering the number of available storage blocks existing in the cache. This might cause the problem about excessive limitation of I/O write requests, and thereby reduce the processing efficiency of the I/O write requests. To solve the above problem, embodiments of the present disclosure further periodically execute the flow shown in FIG. 4. In an alternative embodiment, the periodical execution time of the flow shown in FIG. 4 may be one second.

Figure 4:
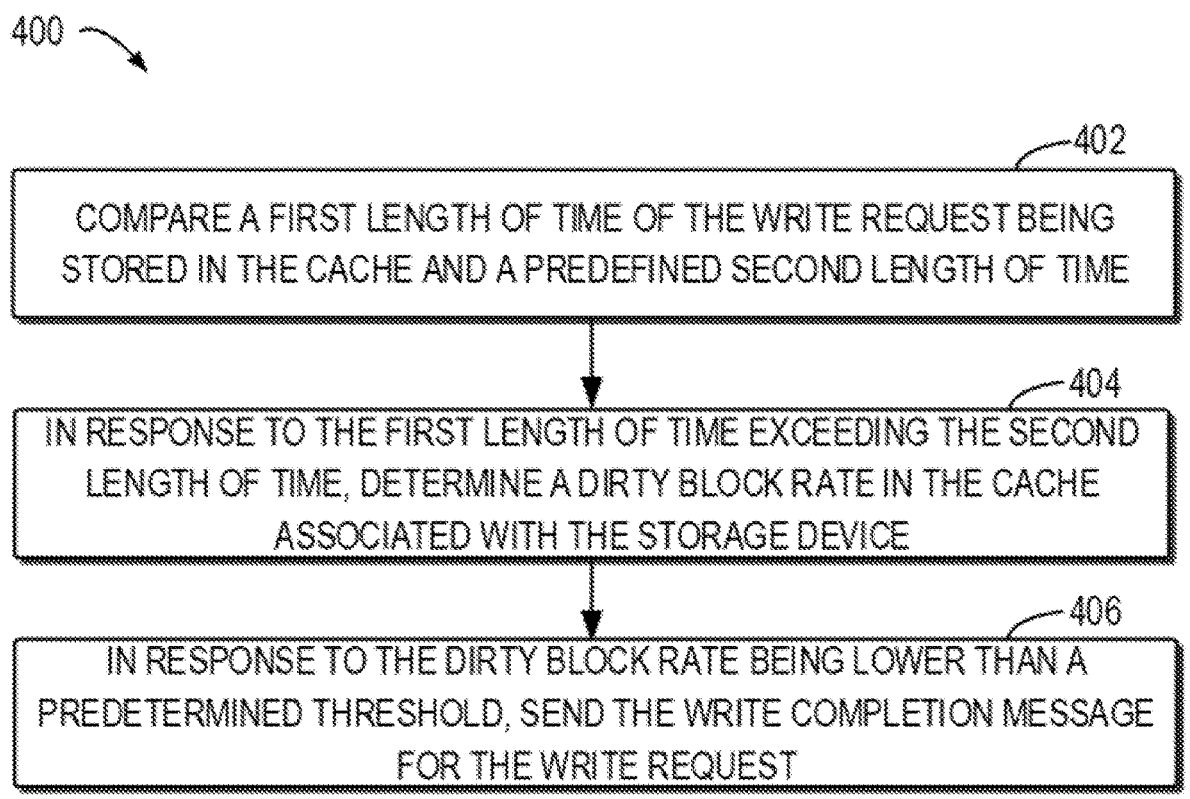
FIG. 4 illustrates a flow chart of a method 400 for managing cache according to an embodiment of the present disclosure.

FIG. 4 illustrates a flow chart of a method 400 for managing cache according to an embodiment of the present disclosure. Since the problem of excessive limitation of write requests occurs in the procedure of executing the method 200 in FIG. 2 or method 300 in FIG. 3, the method 400 in FIG. 4 is periodically executed while executing the method 200 or method 300, to solve the above problem. In order to control the write requests stored in the cache, a predefined time length for storage of write requests is obtained in the cache. The predefined time length may be set as any value according to needs. In an alternative embodiment, the predefined time length may be set as a length of time for the longest flush request for cache to the storage device.

At block 402, a storage time of a write request in the write request queue stored in the cache is obtained, and then a time length that the write request is stored in the cache is compared with the predefined time length. In an alternative embodiment, the obtained write request is a write request ranking the first in the write request queue. In another alternative embodiment, the obtained write request may be selected in other selection manners. When the time length that the write request is stored in the cache is smaller than the predefined time length, the write request in the write queue in the cache is not operated.

At block 404, when the time length that the write request is stored in the cache is longer than the predefined time length, this indicates that the duration that the write request is stored in the cache has already been longer and might excessively affect I/O operation. If sufficient available cache blocks further exist in the cache, the unused cache blocks may be used to release the stored write operations, which may avoid excessive limitation of write operations. To determine whether the cache has sufficient cache blocks, a dirty block rate parameter is set to determine available space of the cache. When the dirty block rate is larger than a predetermined threshold, this indicates that sufficient space of the cache has already been used and the cache cannot be used to store data any more. If the dirty block rate is smaller than the predetermined threshold, this indicates that the cache still have sufficient space to release the stored write requests. Therefore, this can improve the cache utilization rate and the I/O processing efficiency.

When the dirty block rate is determined, first the number of data blocks occupied by the obtained write request is determined, and then the number of dirty blocks in the cache and the number of storage blocks in the cache are obtained. The dirty block rate is determined according to number of data blocks occupied by the write request, the number of dirty blocks in the cache and the number of storage blocks in the cache. In an alternative embodiment, the dirty block rate=(the number of storage blocks occupied by the write request+the number of dirty blocks in the cache)/the number of storage blocks.

At block 406, if the dirty block rate is smaller than the predetermined threshold, this indicates that the cache still have sufficient available storage blocks. Therefore, the write request stored in the cache is released, and a write completion message for the write request is sent. If the dirty block rate is larger than the predetermined threshold, this indicates that there is not enough available storage blocks in the cache, and operation will not be performed.

According to the above method, it is possible to use the storage blocks in the cache very well, and improve the processing time of I/O write request. In an alternative embodiment, if the amount of use of the cache reaches a certain threshold because the stored write requests occupy too many storage blocks, a maximum number of parallel I/O is set to control the number of I/O.

Figure 5:
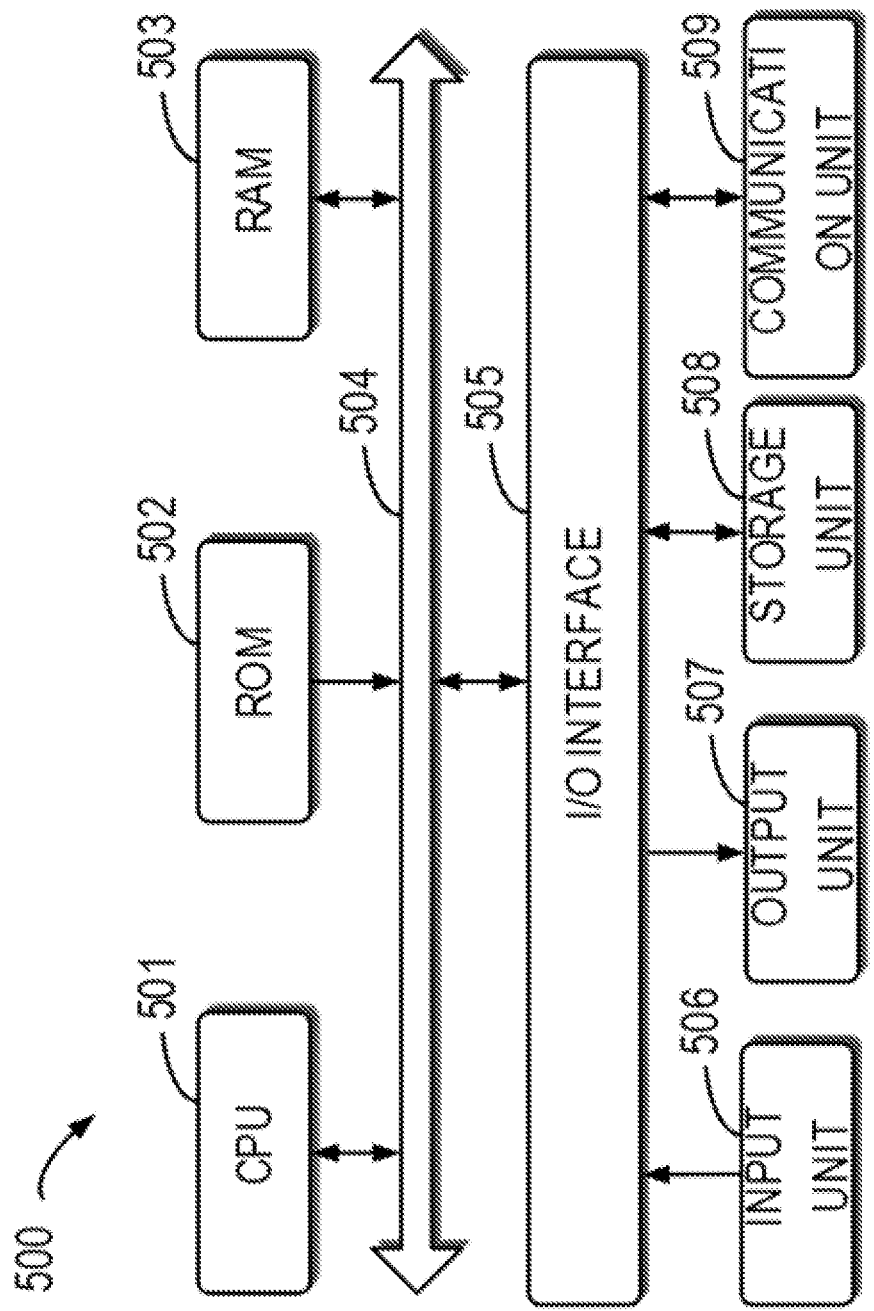
FIG. 5 illustrates a block diagram of an example apparatus 500 adapted to implement an embodiment of the present disclosure.

FIG. 5 illustrates a schematic block diagram of an exemplary apparatus 500 according to an embodiment of the present disclosure. For example, any one 102, 104 and 106 shown in FIG. 1 may be implemented by the apparatus 500. As depicted, the apparatus 500 includes a central processing unit (CPU) 501 which is capable of performing various proper actions and processes in accordance with a computer program instruction stored in a read only memory (ROM) 502 or a computer program instruction loaded from a storage unit 508 to a random access memory (RAM) 503. In the RAM 503, various programs and data needed in the operation of the apparatus 500 may also be stored. The CPU 501, the ROM 502 and the RAM 503 are connected to one another via a bus 504. An input/output (I/O) interface 505 is also connected to the bus 504.

The multiple components in the apparatus 500 are connected to the I/O interface 505, including: an input unit 506, for example, a keyboard, a mouse, or the like; an output unit 507, e.g., various types of displays and loudspeakers; the storage unit 508, such as a magnetic disk, an optical disk or the like; and a communication unit 509 such as a network card, a modem, a radio communication transceiver or the like. The communication unit 509 allows the apparatus 500 to exchange information/data with other devices via a computer network such as Internet and/or various telecommunication networks.

The above-described various procedures and processes, such as methods 200, 300 and 400, may be implemented by the processing unit 501. For example, in some embodiments, the methods 200, 300 and 400 may be implemented as a computer software program, which is tangibly included in a machine-readable medium such as storage unit 508. In some embodiments, parts or all of the computer program may be loaded and/or installed on the apparatus 500 via the ROM 502 and/or the communication unit 509. When the computer program is uploaded to the RAM 503 and executed by the CPU 501, one or more steps of the above method 200, 300 or 400 may be performed.

The present disclosure may be a method, an apparatus, a system and/or a computer program product. The computer program product may include a computer readable storage medium (or media) having computer readable program instructions thereon for carrying out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or be connected to an external computer (for example, connected through the Internet using an Internet Service Provider). In some embodiments, state information of the computer readable program instructions is used to personalized customize the electronic circuitry, for example, programmable logic circuitry, field-programmable gate arrays (FPGA), or programmable logic arrays (PLA). This electronic circuitry may execute the computer readable program instructions, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions which when executed by the processor of the computer or other programmable data processing apparatus, generate means for implementing the functions/acts specified in block or blocks of the flowchart and/or block diagram. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in block or blocks of the flowchart and/or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in block or blocks of the flowchart and/or block diagram.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, a portion of program segment or instructions, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing cache, comprising:
    determining a cache flush time period of the cache for a lower-layer storage device associated with the cache;
    in response to determining the cache flush time period, comparing the determined cache flush time period to a preset threshold amount of time;
    in response to receiving a write request, determining whether data associated with the write request has been stored into the cache;
    in response to a miss of the data in the cache, storing the write request and the data in the cache without returning a write completion message for the write request; and
    in response to the length of the cache flush time period being longer than the threshold length of time, marking the storage device for processing the write request.

2. The method according to claim 1, further comprising:
    determining a first number of storage blocks in the cache that are released by a flush to the storage device and are available for the storage device; and
    in response to the number being greater than a second number of storage blocks occupied by the data, sending the write completion message for the write request.

3. The method according to claim 1, wherein determining the cache flush time period for the storage device comprises:
    obtaining a plurality of historical flush time periods for a plurality of previous flushes from the cache to the storage device; and
    determining the cache flush time period by averaging the plurality of historical flush time periods.

4. The method according to claim 2, further comprising:
in response to sending the write completion message, subtracting the second number from the first number.

5. The method according to claim 1, further comprising:
comparing a first length of time of the write request being stored in the cache and a predefined second length of time;
in response to the first length of time exceeding the second length of time, determining a dirty block rate in the cache associated with the storage device; and
in response to the dirty block rate being lower than a predetermined threshold, sending the write completion message for the write request.

6. The method according to claim 5, further comprising:
determining a first number of storage blocks in the cache that are released by a flush to the storage device and are available for the storage device;
obtaining the number of storage blocks in the cache and the number of dirty blocks in the cache; and
determining the dirty block rate based on the first number, the number of storage blocks in the cache, and the number of dirty blocks in the cache.

7. A cache manager, the cache comprising a plurality of storage blocks, the cache manager comprising:
a processor; and
a memory having computer program instructions stored thereon, the processor executing the computer program instructions in the memory to control the memory system to perform acts comprising:
determining a cache flush time period of the cache for a lower-layer storage device associated with the cache;
in response to determining the cache flush time period, comparing the determined cache flush time period to a preset threshold amount of time;
in response to receiving a write request, determining whether data associated with the write request has been stored into the cache;
in response to a miss of the data in the cache, storing the write request and the data in the cache without returning a write completion message for the write request; and
in response to the length of the cache flush time period being longer than the threshold length of time, marking the storage device for processing the write request.

8. The manager according to claim 7, further comprising:
determining a first number of storage blocks in the cache that are released by a flush to the storage device and are available for the storage device;
in response to the number being greater than a second number of storage blocks occupied by the data, sending the write completion message for the write request.

9. The manager according to claim 7, wherein determining the cache flush time period for the storage device comprises:
obtaining a plurality of historical flush time periods for a plurality of previous flushes from the cache to the storage device; and
determining the cache flush time period by averaging the plurality of historical flush time periods.

10. The manager according to claim 8, further comprising:
in response to sending the write completion message, subtracting the second number from the first number.

11. The manager according to claim 7, further comprising:
comparing a first length of time of the write request being stored in the cache and a predefined second length of time;
in response to the first length of time exceeding the second length of time, determining a dirty block rate in the cache associated with the storage device; and
in response to the dirty block rate being lower than a predetermined threshold, sending the write completion message for the write request.

12. The manager according to claim 11, further comprising:
determining a first number of storage blocks in the cache that are released by a flush to the storage device and are available for the storage device;
obtaining the number of storage blocks in the cache and the number of dirty blocks in the cache; and
determining the dirty block rate based on the first number, the number of storage blocks in the cache, and the number of dirty blocks in the cache.

13. A computer program product for managing cache, comprising:
a non-transitory computer readable medium encoded with computer-executable code, the code configured for the execution of:
determining a cache flush time period of the cache for a lower-layer storage device associated with the cache;
in response to determining the cache flush time period, comparing the determined cache flush time period to a preset threshold amount of time;
in response to receiving a write request, determining whether data associated with the write request has been stored into the cache;
in response to a miss of the data in the cache, storing the write request and the data in the cache without returning a write completion message for the write request; and
in response to the length of the cache flush time period being longer than the threshold length of time, marking the storage device for processing the write request.

14. The computer program product of claim 13, the code further configured for the execution of:
determining a first number of storage blocks in the cache that are released by a flush to the storage device and are available for the storage device; and
in response to the number being greater than a second number of storage blocks occupied by the data, sending the write completion message for the write request.

15. The computer program product of claim 13, wherein determining the cache flush time period for the storage device comprises:
obtaining a plurality of historical flush time periods for a plurality of previous flushes from the cache to the storage device; and
determining the cache flush time period by averaging the plurality of historical flush time periods.

16. The computer program product of claim 14, the code further configured for the execution of:
in response to sending the write completion message, subtracting the second number from the first number.

17. The computer program product of claim 13, the code further configured for the execution of:
comparing a first length of time of the write request being stored in the cache and a predefined second length of time;
in response to the first length of time exceeding the second length of time, determining a dirty block rate in the cache associated with the storage device; and in response to the dirty block rate being lower than a predetermined threshold, sending the write completion message for the write request.

\* \* \* \* \*